(12) United States Patent
Young

(10) Patent No.: US 7,067,938 B1
(45) Date of Patent: Jun. 27, 2006

(54) VEHICLE-MOUNTED ELECTRONIC COMPONENT SECURITY ASSEMBLY

(76) Inventor: John A. Young, 608 Briarcliff Rd., Eustis, FL (US) 32726-6457

( * ) Notice: Subject to any disclaimer, the term of this patent is extended or adjusted under 35 U.S.C. 154(b) by 550 days.

(21) Appl. No.: 10/395,978

(22) Filed: Mar. 26, 2003

(51) Int. Cl.
*B16L 1/00* (2006.01)
(52) U.S. Cl. .................................. 307/9.1; 307/10.1
(58) Field of Classification Search ................ 307/10.2
See application file for complete search history.

(56) References Cited

U.S. PATENT DOCUMENTS

| | | | |
|---|---|---|---|
| 1,748,013 A * | 2/1930 | Douglas | 200/296 |
| 2,104,689 A * | 1/1938 | Barker et al. | 200/541 |
| 4,100,372 A | 7/1978 | Hypolite | |
| 4,438,426 A | 3/1984 | Adkins | |
| 4,683,462 A | 7/1987 | Takeda et al. | |
| 4,697,171 A | 9/1987 | Suh | |
| 4,848,716 A | 7/1989 | Nakamoto | |
| 5,745,044 A | 4/1998 | Hyatt, Jr. et al. | |

* cited by examiner

*Primary Examiner*—Phuong T. Vu
*Assistant Examiner*—Carlos Amaya

(57) ABSTRACT

A vehicle-mounted electronic component security assembly for enabling and disabling the electronic components in a vehicle as desired. The vehicle-mounted electronic component security assembly includes a vehicle having a dashboard; and also includes a bracket being fastened to the dashboard; and further includes a lock switch assembly being securely mounted to the bracket; and also includes electronic circuitry being connected to the lock switch assembly and being adapted to be connected to electronic components in the vehicle.

2 Claims, 3 Drawing Sheets

VEHICLE-MOUNTED ELECTRONIC COMPONENT SECURITY ASSEMBLY

BACKGROUND OF THE INVENTION

1. Field of the Invention

The present invention relates to vehicle component lock systems and more particularly pertains to a new vehicle-mounted electronic component security assembly for enabling and disabling the electronic components in a vehicle as desired.

2. Description of the Prior Art

The use of vehicle component lock systems is known in the prior art. More specifically, vehicle component lock systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,683,462; U.S. Pat. No. 5,745,044; U.S. Pat. No. 4,697,171; and U.S. Pat. No. 4,848,716.

While these devices fulfill their respective, particular objectives and requirements, the aforementioned patents do not disclose a new vehicle-mounted electronic component security assembly. The prior art includes switches and alarms set up in vehicles to prevent theft of the electronic components.

SUMMARY OF THE INVENTION

The general purpose of the present invention, which will be described subsequently in greater detail, is to provide a new vehicle-mounted electronic component security assembly which has many of the advantages of the vehicle component lock systems mentioned heretofore and many novel features that result in a new vehicle-mounted electronic component security assembly which is not anticipated, rendered obvious, suggested, or even implied by any of the prior art vehicle component lock systems, either alone or in any combination thereof. The present invention includes a vehicle having a dashboard; and also includes a bracket being fastened to the dashboard; and further includes a lock switch assembly being securely mounted to the bracket; and also includes electronic circuitry being connected to the lock switch assembly and being adapted to be connected to electronic components in the vehicle. None of the prior art includes the combination of the elements of the present invention.

There has thus been outlined, rather broadly, the more important features of the vehicle-mounted electronic component security assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new vehicle-mounted electronic component security assembly which has many of the advantages of the vehicle component lock systems mentioned heretofore and many novel features that result in a new vehicle-mounted electronic component security assembly which is not anticipated, rendered obvious, suggested, or even implied by any of the prior art vehicle component lock systems, either alone or in any combination thereof.

Still another object of the present invention is to provide a new vehicle-mounted electronic component security assembly for enabling and disabling the electronic components in a vehicle as desired.

Still yet another object of the present invention is to provide a new vehicle-mounted electronic component security assembly that is easy and convenient to install and use.

Even still another object of the present invention is to provide a new vehicle-mounted electronic component security assembly that prevents unauthorized use of selected electronic equipment in a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
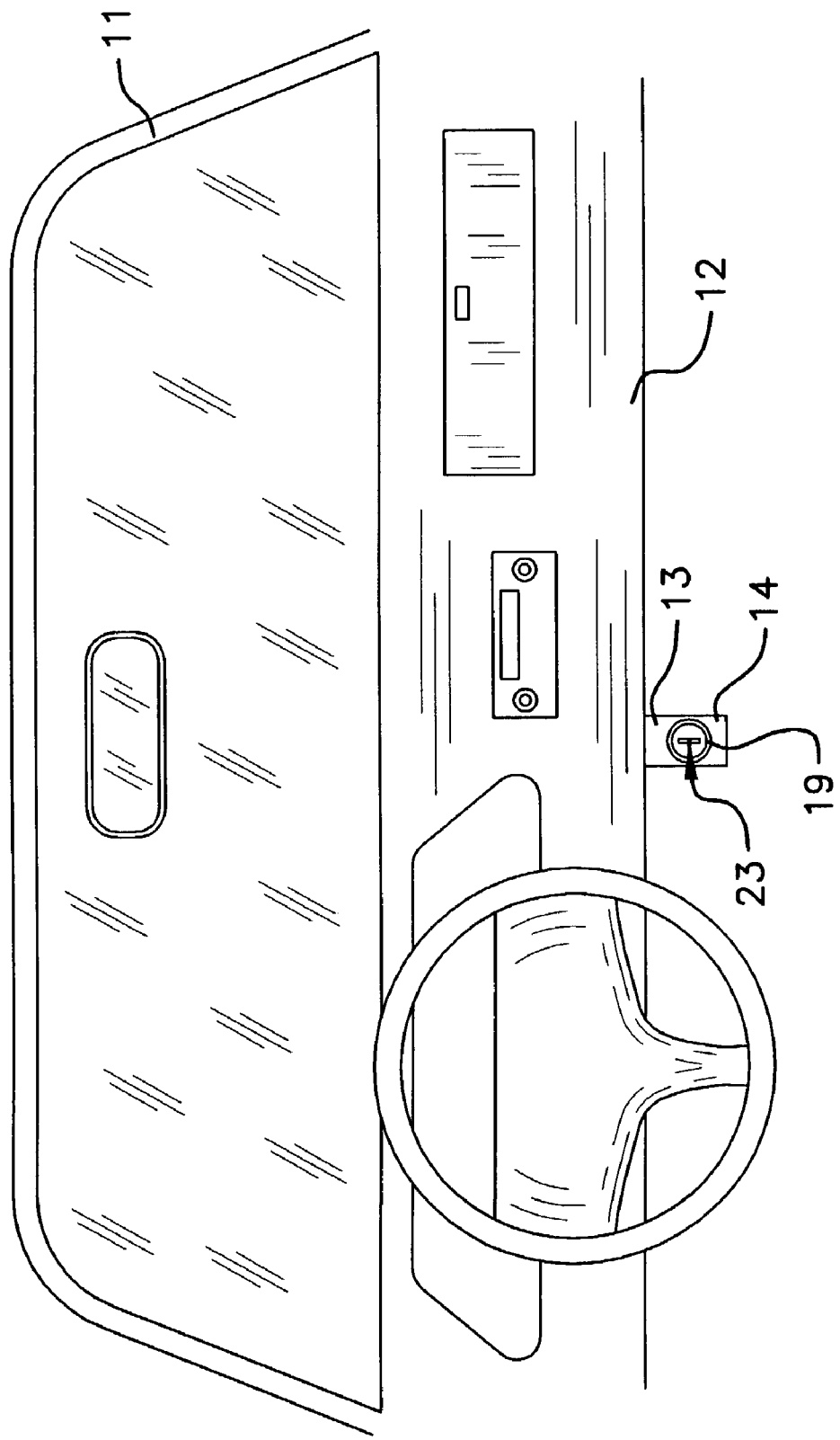
FIG. 1 is a front elevational view of a new vehicle-mounted electronic component security assembly according to the present invention.
Figure 2:
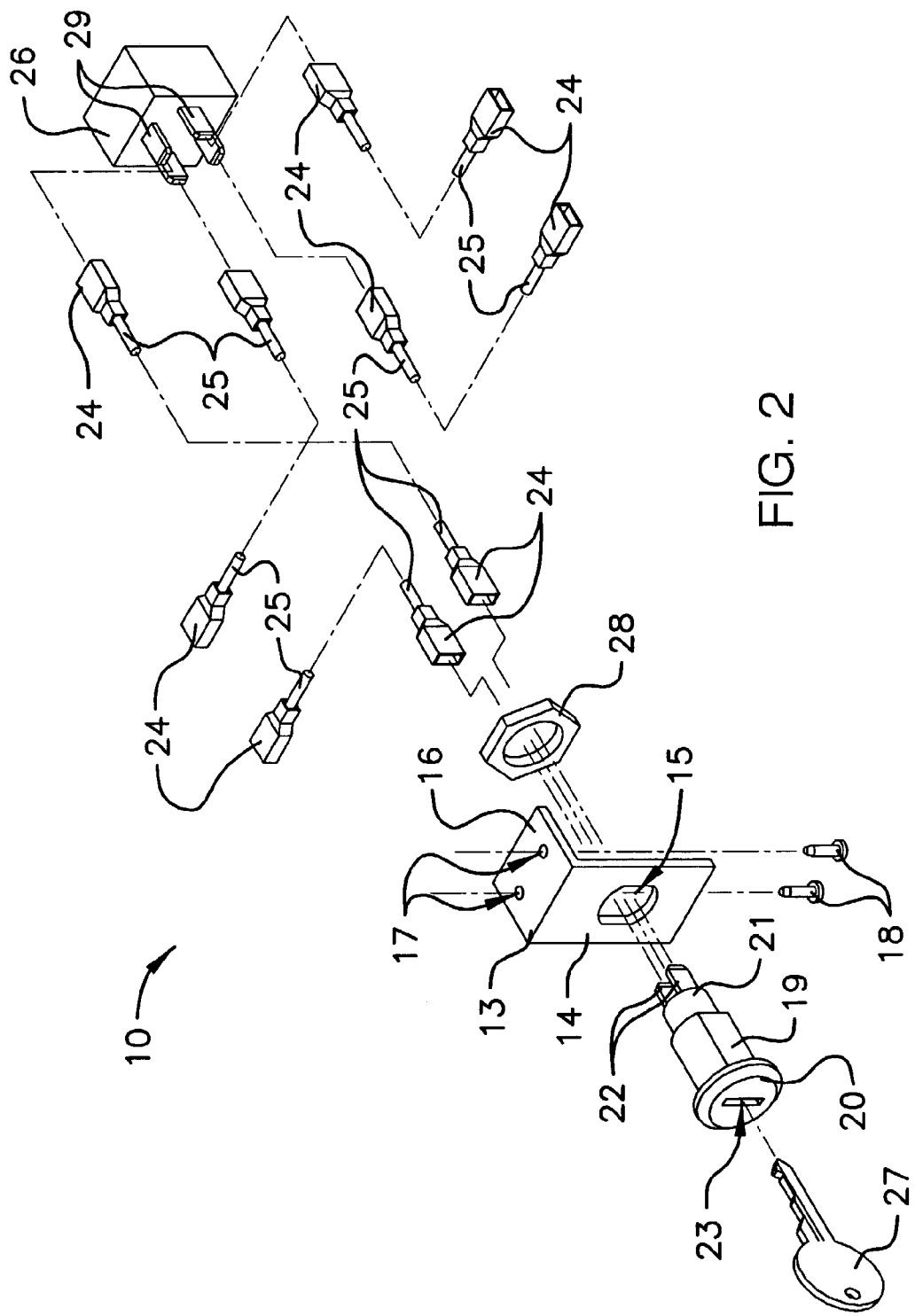
FIG. 2 is an exploded perspective view of the present invention.
Figure 3:
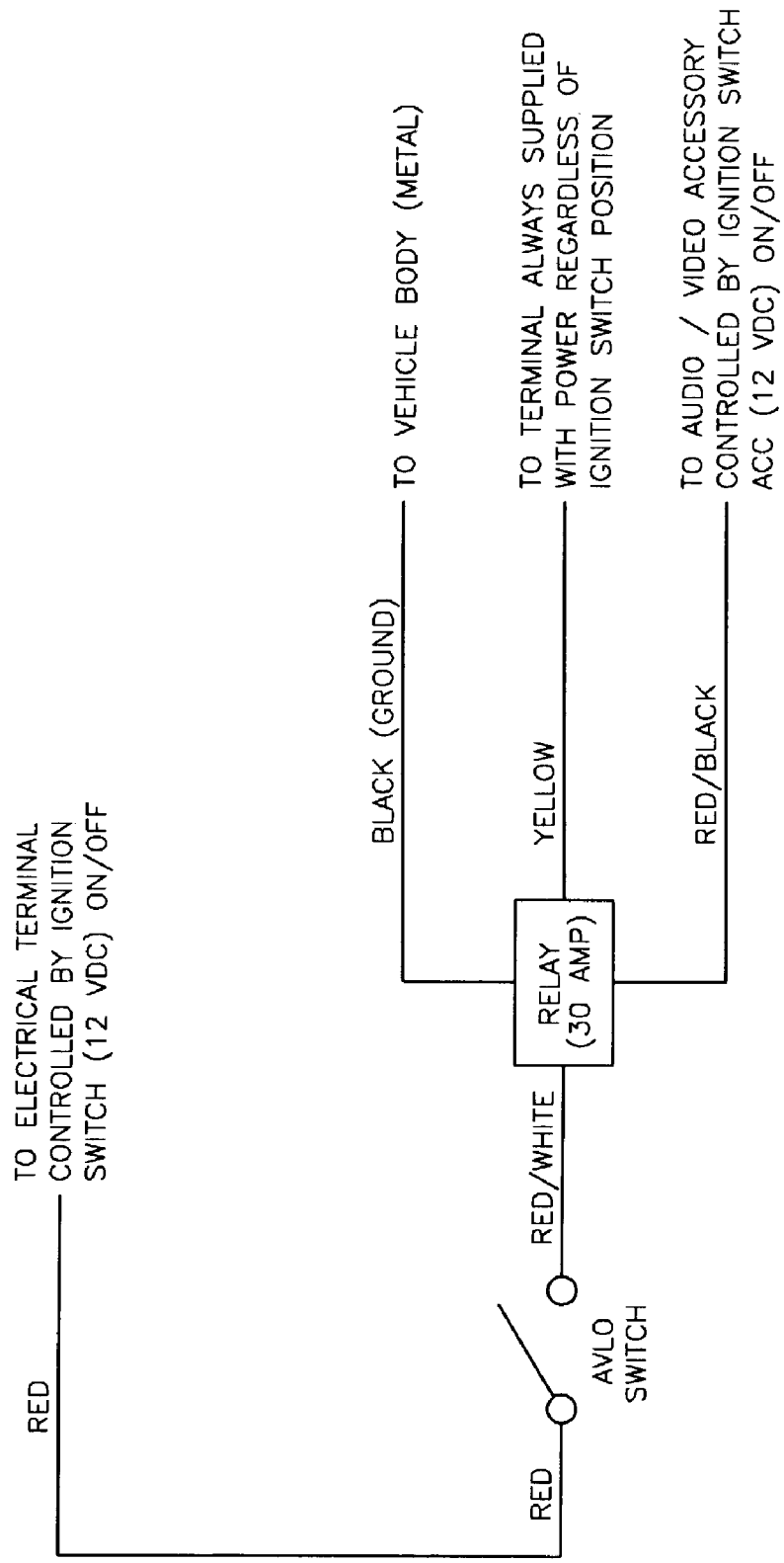
FIG. 3 is a schematic diagram of the electronic circuitry of the present invention.

With reference now to the drawings, and in particular to FIGS. 1 through 3 thereof, a new vehicle-mounted electronic component security assembly embodying the principles and concepts of the present invention and generally designated by the reference numeral 10 will be described.

As best illustrated in FIGS. 1 through 3, the vehicle-mounted electronic component security assembly 10 generally comprises a vehicle 11 having a dashboard 12. A bracket 13 is fastened to the dashboard 12. The bracket 13 includes a planar main portion 14 and also includes a planar end portion 16 being angled relative to the planar main portion 14 and having holes 17 being disposed therethrough to fasten the bracket 13 to the dashboard 12 with fasteners 18. The bracket 13 further includes an opening 15 being disposed through the planar main portion 14.

A lock switch assembly is securely mounted to the bracket 13. The lock switch assembly includes lock switch mechanism 19 having front and back ends 20,21 and being removably and securely disposed in the opening 15 of the bracket 13, and also includes a fastening member 28 for fastening the lock switch mechanism 19 to the bracket 13, and further includes a key 27 for locking and unlocking the lock switch mechanism 19. The lock switch mechanism 19 also has prongs 22,29 securely extending outwardly from the back end 21 thereof, and further has a key slot 23 being disposed through the front end 20 thereof for opening and closing circuits securely disposed in the lock switch mechanism 19.

Electronic circuitry is removably and securely connected to the lock switch assembly and is adapted to be connected to electronic components in the vehicle 11. The electronic circuitry includes a plurality of electronic component connectors 24 having female connectors being removably and engageably attached to the prongs 22,29 and being securely connected to wires 25 which are securely connected to electronic components in the vehicle 11. The electronic circuitry also includes a relay switch 26 having prongs securely attached thereto and being securely connected to the lock switch assembly and being adapted to be connected to the electronic components in the vehicle 11.

In use, the user inserts the key 27 into the lock switch mechanism 19 either to disconnect the circuits therein so that the electronic devices in the vehicle 11 are disabled without power and cannot be played, or to complete the circuits so that the electronic devices in the vehicle 11 are enabled with power and can be used and played as desired by the user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the vehicle-mounted electronic component security assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle-mounted electronic component security assembly comprising:
   a vehicle having a dashboard;
   a bracket being fastened to said dashboard, said bracket including a planar main portion and also including a planar end portion being angled relative to said planar main portion and having holes being disposed therethrough to fasten said bracket to said dashboard with fasteners, said bracket further including an opening being disposed through said planar main portion;
   a lock switch assembly being securely mounted to said bracket, said lock switch assembly including lock switch mechanism having front and back ends and being removably and securely disposed in said opening of said bracket, and also including a fastening member for fastening said lock switch mechanism to said bracket, and further including a key for locking and unlocking said lock switch mechanism, said lock switch mechanism also having prongs extending outwardly from said back end thereof, and further having a key slot being disposed through said front end thereof for opening and closing circuits disposed in said lock switch mechanism; and
   electronic circuitry being connected to said lock switch assembly and being adapted to be connected to electronic components in said vehicle, said electronic circuitry including a plurality of electronic component connectors having female connectors being removably attached to said prongs and being connected to wires which are connected to electronic components in the vehicle.

2. The vehicle-mounted electronic component security assembly as described in claim 1, wherein said electronic circuitry also includes a relay switch having prongs attached thereto and being connected to said lock switch assembly and being adapted to be connected to the electronic components in said vehicle.

* * * * *